United States Patent [19]

Kelce

[11] Patent Number: 5,800,145
[45] Date of Patent: Sep. 1, 1998

[54] CARGO RESTRAINING DEVICE

[76] Inventor: Donald Lee Kelce, 503 Florence St., Philipsburg, Pa. 16866-2405

[21] Appl. No.: 857,644

[22] Filed: May 16, 1997

[51] Int. Cl.$^6$ .................................................. B60P 7/14
[52] U.S. Cl. ...................... 410/142; 410/121; 410/129; 410/135
[58] Field of Search ............................. 410/121, 129, 410/141, 142, 135; 296/37.6; 224/42.33, 42.34, 403; 220/530, 531

[56] References Cited

U.S. PATENT DOCUMENTS

| | | | |
|---|---|---|---|
| 3,413,932 | 12/1968 | Bennett | 410/142 |
| 4,507,033 | 3/1985 | Boyd | 410/104 |
| 4,770,579 | 9/1988 | Aksamit | 410/150 |
| 5,147,103 | 9/1992 | Ducote | 296/37.6 |
| 5,240,301 | 8/1993 | Arnold | 410/129 X |
| 5,265,993 | 11/1993 | Wayne | 410/129 |
| 5,586,850 | 12/1996 | Johnson | 410/129 X |

*Primary Examiner*—Stephen T. Gordon
*Attorney, Agent, or Firm*—Thomas E. Sterling

[57] ABSTRACT

A convertible cargo holding device positioned in the bed of a pick-up truck, the bed having a floor, a left side panel, a right side panel, and a front panel comprising in combination: a base gate; a secondary gate hinged upon the base gate; a removable rear base gate hinge attached to left side panel and rotatably attached to the base gate; a removable forward base gate hinge attached to the left side panel and rotatably attached to the base gate; a transverse base gate hinge attached to the right side panel and rotatably attached to the base gate, the transverse base gate hinge adapted to receive the removable forward base gate hinge; a removable support attached to the left side panel and to both the base gate and to the secondary gate. The elements of the cargo holding device can be rotated about its hinged elements to form a container, a low barrier and a high barrier for containing cargo within the bed.

7 Claims, 5 Drawing Sheets

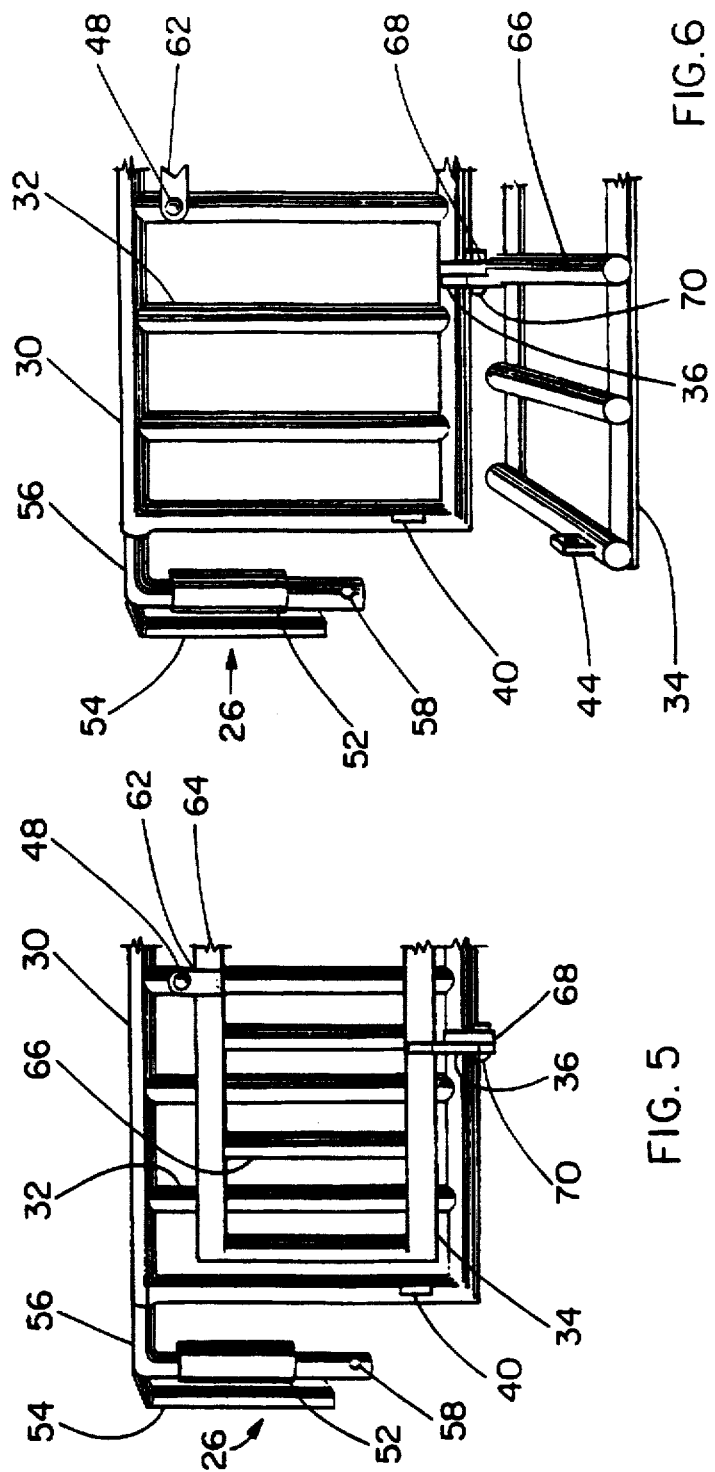

CARGO RESTRAINING DEVICE

BACKGROUND OF THE INVENTION

1. Field of the Invention

This invention relates to cargo holders and in particular to cargo holders used in the bed area of pick-up trucks to restrain cargo at selected locations.

2. Prior Art and Problems

The problem of shifting cargo in the bed area of pick-up trucks is well known. Turns and stops of pick-up trucks exert great forces on cargo causing shifting bumps and overturns, and frequent damage to both the truck bed area and to the cargo. This problem has been addressed by some patents, for example, U.S. Pat. No. 5,240,301 by Arnold which describes a bed liner with cargo restraint capabilities.

Boyd, U.S. Pat. No. 4,507,033, discloses a restraint system using clamping devices attached to the bed area.

SUMMARY OF THE INVENTION

The present invention is a cargo restraining device for pick-up trucks or the like attached in the cargo area which can be easily converted to restrain cargo in three different modes, as follows:

Container—Mode 1. The device is attached to the side wall of the bed area so as to form a cargo container in which truck cargo is deposited and restrained during transport;

Low Barrier—Mode 2. The container of Mode 1 is disconnected from the side wall and is pivoted on hinges to extend horizontally across the lower bed area of the truck at about the wheel well area. Cargo placed to the rear of the cargo carrier device will be restrained from moving forward;

Elevated Barrier—Mode 3. The cargo carrier device of Mode 2 may be rotated on hinges to extend horizontally above and across the bed area of the truck. In this position cargo, i.e: lengths of 2×4 lumber or the like, may be longitudinally placed in the well area, and in contact with the front panel of the bed area. The device is thus easily converted to Modes 1, 2 or 3 with little trouble or effort. Cargo of various types can be restrained easily. The cargo carrier device may also be removed easily from the bed area of the pick-up truck and easily attached thereto.

OBJECTS OF THE INVENTION

It is an object of this invention to provide a cargo restraining device convertable to restrain cargo of differing types.

It is another object of this invention to provide a cargo restraining device convertable into differing cargo carrying modes.

It is yet another object of this invention to provide an easily convertable cargo carrying device for pick-up trucks.

Still another object of this invention is to provide a cargo carrying device which may be easily attached or detached from a pick-up truck.

BRIEF DESCRIPTION OF THE DRAWINGS

FIG. 5 is a perspective view of the rear portion of the invention of FIG. 4 showing the base gate and the secondary gate in contact and in the locked position.

FIG. 6 is a perspective view of the invention of FIG. 5 showing the base gate and the secondary gate in their open and unlocked position.

DETAILED DESCRIPTION OF THE PREFERRED EMBODIMENTS

Figure 1:
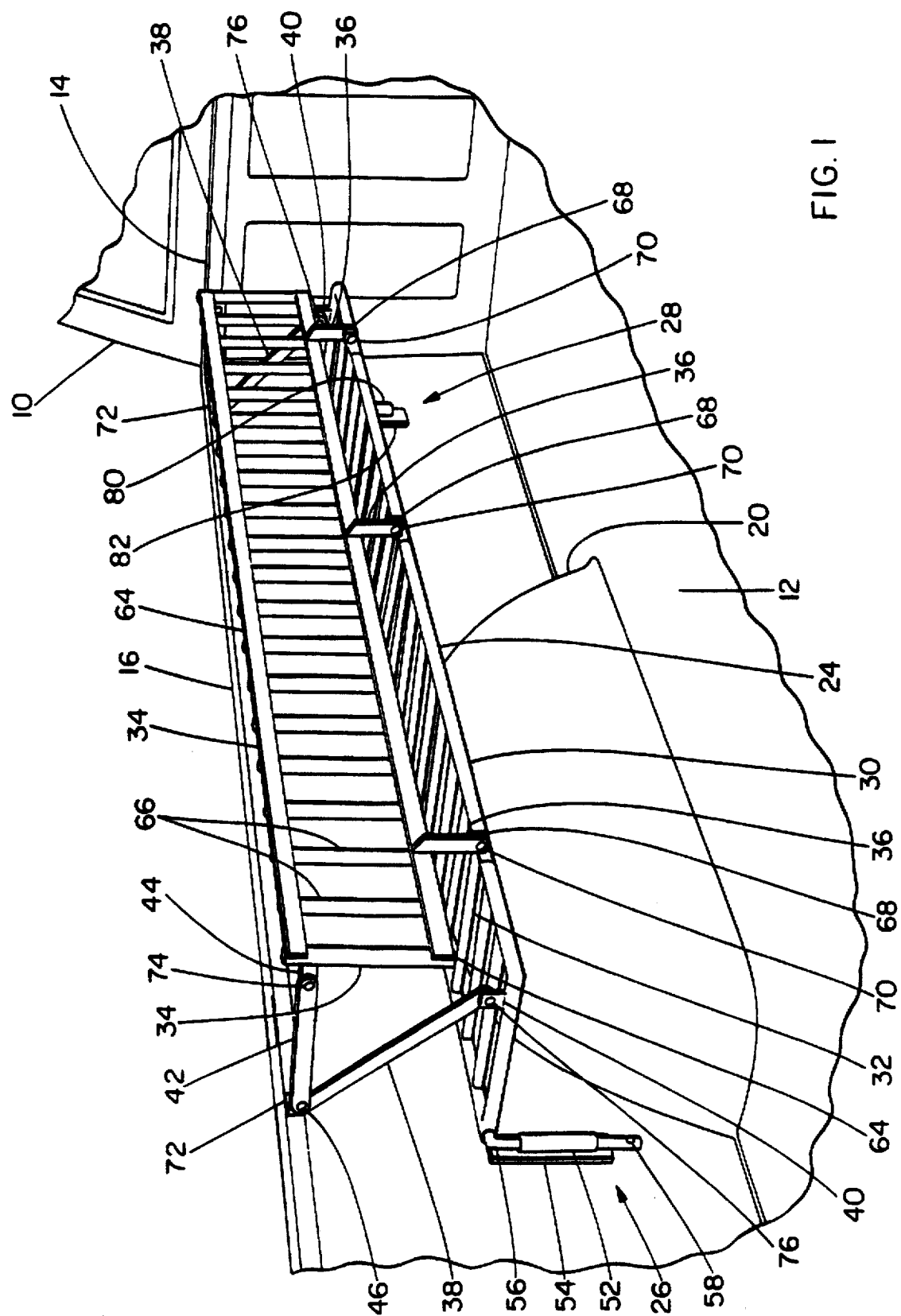
FIG. 1 is a partial perspective view of the cargo restraining device according to the present invention in a Mode 1 operation and located in a pick-up truck bed.
Figure 2:
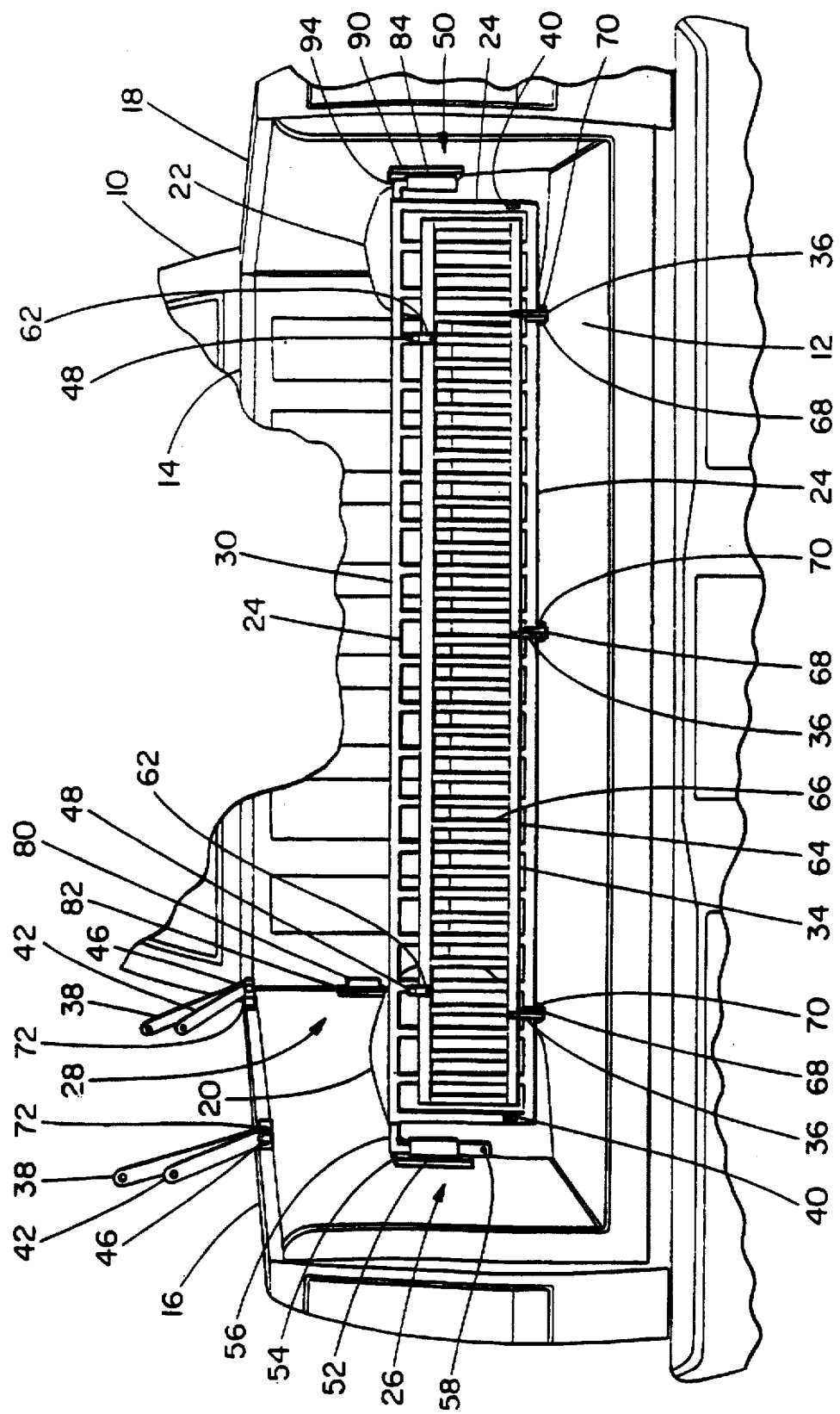
FIG. 2 is a perspective view of the cargo restraining device taken from the rear of a pick-up truck in which it is installed in a Mode 2 configuration showing support members disconnected.

Referring now to FIGS. 1 and 2, 10 represents the pick-up truck on which the invention is positioned. 12 represents the bed of the truck 10. A front panel 14 is positioned at the forward end of the bed 12. Left side panel 16 and right side panel 18 are positioned on either side of the bed 12 respectively. Left rear wheel well 20 containing the left truck wheel (not shown) and right rear wheel well 22 containing the right truck wheel (not shown) are positioned on either side of the bed 12 on left side panel 16 and right side panel 18 respectively.

The invention in its Container-Mode 1 configuration (see FIG. 1) is comprised of a base gate 24 attached to the left side panel 16 by left rear base gate hinge 26 and left forward base gate hinge 28. Base gate 24 is comprised of a rectangular tubular shaped base gate frame 30. Tubular members 32 extend across the base gate frame 30.

Figure 4:
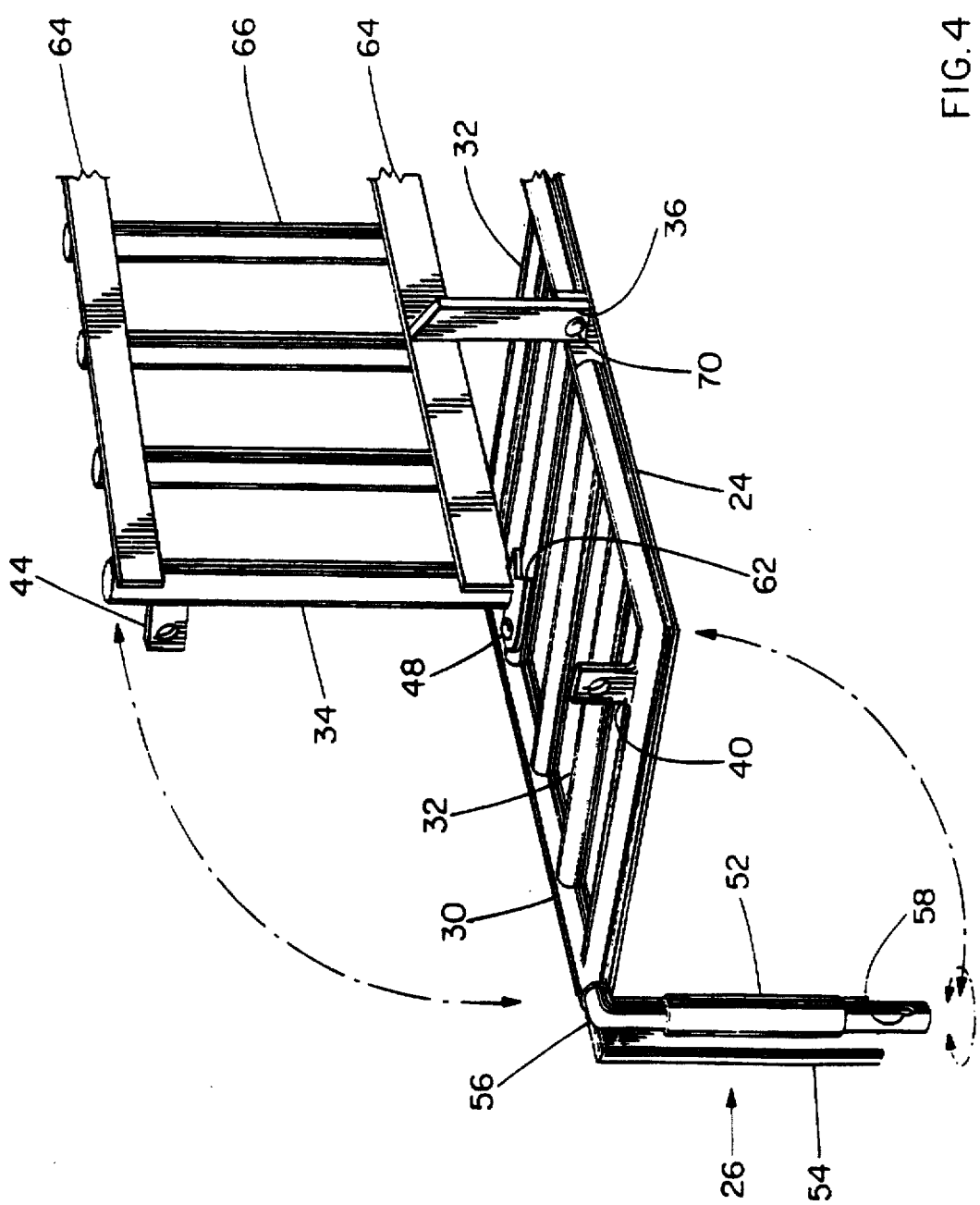
FIG. 4 is a perspective view of the rear portion of the invention shown in FIG. 1, showing the range of rotation of the base gate hinge and secondary gate hinge.

Left rear base gate hinge 26 is comprised of a hollow hinge cylinder 52 which is attached to a hinge plate 54 which is welded to left side panel 16 (see FIG. 4).

A pivot member 56 extends within hollow hinge cylinder 52 and is rotatable therein. The opposite end portion of pivot member 56 is bent to a right angle and extends within base gate 24 and is rotatable therein.

Left forward base gate hinge 28 is attached to left side panel 16 of pick-up truck 10. Left forward base gate hinge 28 is comprised of a hollow hinge cylinder 80 attached to base gate hinge plate 82 which is welded to the left side panel 16 of pick-up truck 10. The left rear pivot member 56 of hinge 26 extends within left forward hollow hinge cylinder 80. It should be noted that the function of elements of left rear base gate hinge 26 and left forward base gate hinge 28 are similar.

In the Low Barrier Mode 2 and Elevated Barrier Mode 3 operation a right rear base gate hinge 50 attaches to the right side panel 18 of pick-up truck 10. Right rear base gate hinge 50 is comprised of a right rear base gate cylinder 84 which is attached to a base gate hinge plate 90. This is welded to the right rear panel 18 of pick-up truck 10. In operation, Low Barrier Mode 2 and Elevated Barrier Mode 3 may be achieved by disconnecting base gate support member 38 and secondary gate support member 42 between the left side panel 16 and the base gate 24 and secondary gate 34. Base gate 24 may be lifted free of left forward base gate hinge 28 and rotated about left rear hollow hinge cylinder 52 until pivot member 94 is inserted in right base gate cylinder 84. Next, the base gate 24 may be rotated about left rear base gate hinge 26 and left forward base gate hinge 28 to form the configurations of Low Barrier Mode 2; then, by additional rotations about left rear base gate hinge 26 and right rear base gate hinge 50 to form the configurations of Elevated Barrier Mode 3. These may be envisioned by examination of the Figures and in particular to the rotation indicated in FIG. 4. A gate lock 62 consisting of a rotatable member is pivoted upon base gate frame 30 and may be rotated to engage secondary gate 34 thus clamping secondary gate 34 to base gate 24. This is utilized in the Low Barrier Mode 2 and Elevated Barrier Mode 3 configurations assuring that base gate 24 and secondary gate 34 are held securely. When Container Mode 1 configuration is desired the gate lock 62 is disengaged. The device may be alternately switched between Low Barrier Mode 2 and Elevated Barrier Mode 3 operations by rotating base gate 24 and secondary gate 34 about the left rear base gate hinge 26 and right rear base gate hinge 50. The invention may be changed to the FIG. 1 configuration by reversing the procedural steps already given.

A padlock hole 58 extends through the end portion of pivot member 56 of left rear base gate hinge 26. A padlock (not shown) may be locked in this position thus preventing the device from being stolen and removed from pick-up truck 10. When in Low Barrier Mode 2 and Elevated Barrier Mode 3 configurations base gate 24 and secondary gate 34 may be resting upon left rear wheel well 20 and right rear wheel well 22 thus giving support to the device. In Container Mode 1 operation the cargo (not shown) is contained within a box-like structure preventing it from moving about. In Low Barrier Mode 2 left rear pivot member 56 is bent to a right angle and extends within base gate frame 30 and is rotatable therein. Thus both left rear base gate hinge 26 and left forward base gate hinge 28 will allow base gate 24 to rotate both in a horizontal and a vertical plane. Dotted rotation lines of FIG. 4 indicate the scope of rotation. Base gate 24 may be lifted free of left rear base gate hinge 26 and left forward base gate hinge 28 by upwardly withdrawing left rear pivot member 56 from hinge cylinder 52. See FIG. 4 dotted lines rotation paths.

A secondary gate 34 is rotatably attached to base gate frame 30 by three hinge extensions 36 positioned on the length of base gate frame 30. Secondary gate 34 is comprised of two flat outer members 64 between which are secured numerous tubular cross members 66. Three hinge extensions 36 are welded to a flat outer member 64 and are rotatably positioned on three secondary gate hinges 68 which are welded to base gate frame 30. Hinge bolts 70 extend through each hinge extensions 36-and secondary gate hinges 68 which are welded to base gate frame 30. Thus secondary gate 34 may rotate on secondary gate hinge 68. When free, base gate 24 may be rotated on pivot member 56 to form the configuration shown in FIG. 2. A flat gate lock 62 is rotatably positioned by gate lock bolt 48 on a tubular member 32. When base gate 24 and secondary gate 34 are in contact, gate lock 62 must be rotated over flat outer member 64 to lock secondary gate 34 and base gate 24 together. (See FIGS. 5 and 6.) Referring again to FIG. 1, secondary gate support member 42 and base gate support member 38 are rotatably attached to panel plate 72 secured to left side panel 16. Secondary plate support member 42 extends to support protrusion 44 where it is rotatably attached to support protrusion 44 by a support bolt 74 which extends through support protrusion 44 and secondary gate support member 42 and is rotatable. Base gate support member 38 extends to base gate protrusions 40 on base gate frame 30. A removable bolt 76 extends through base gate protrusions 40 and base gate support member 38 allowing rotation of those elements about removable bolt 76. These elements are duplicated on the forward end portion of base gate 24 and are similarly labeled.

It should be noted that secondary support member 42 and base gate 24 together with left side panel 16 form a container into which items of cargo (not shown) may be placed to restrain the cargo during transportation. Such items of cargo (not shown) may now be restrained while being transported.

To convert Container Mode 1 of the invention to Low Barrier Mode 2, support bolt 74 and removable bolt 76 are removed freeing secondary gate support member 42 and base gate support member 38. These elements may be seen extending outwardly in FIG. 2. Note that base gate support member 38 and secondary gate support member 42 are duplicated and identically numbered on both ends of base gate frame 30 and secondary gate 34. They must be disconnected when converting from Container Mode 1 to Low Barrier Mode 2. They are re-connected when converting back to Container Mode 1 and the reverse procedure followed.

Base gate 24 is now lifted, freeing pivot member 56 of left forward base gate hinge 28 to rotate and be inserted in right rear base gate hinge 50 as is shown in FIG. 2. A barrier consisting of base gate 24 and secondary gate 34 now prevents cargo (not shown) from moving forward.

Low Barrier Mode 2. The invention may now be transformed into Low Barrier Mode 2. A right rear base gate hinge 50 is similar to left rear base gate hinge 26. Right rear base gate hinge 50 is positioned to receive pivot member 56 of the left forward base gate hinge 28.

Figure 3:
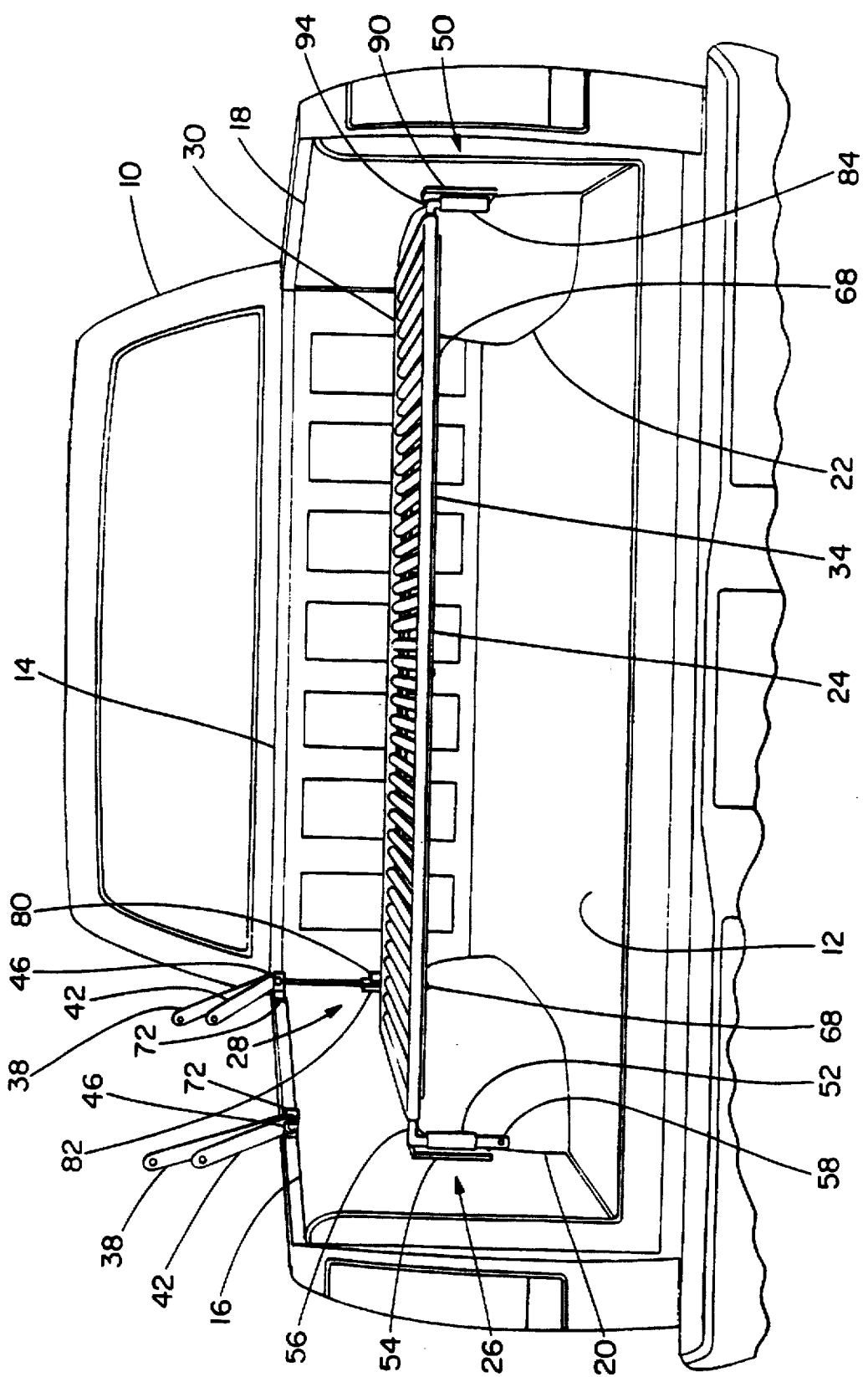
FIG. 3 is a perspective view of the invention in a Mode 3 operation taken from the rear of a pick-up truck, (tail-gate not shown), in which it is installed.

Elevated Barrier Mode 3. Low Barrier Mode 2 of the invention is converted to Elevated Barrier Mode 3 by rotating base gate 24 and attached secondary gate 34 to the rear and upward on rear left base gate hinge 26 and right rear base gate hinge 50. (See FIG. 3.) In this position secondary gate 34 is resting on left and right wheel wells 20 and 22 respectively. The bed 12 may now be loaded with cargo (not shown) against front panel 14. This easy and quick adjustment allows fast accomodation of different cargoes in pick-up truck 10.

I claim:

1. A convertible cargo holding device positioned in the bed of a pick-up truck, said bed having a floor, a left side panel, a right side panel and a front panel comprising in combination:

a base gate;

a secondary gate hinged upon said base gate;

a removable rear base gate hinge means attached to said left side panel and rotatably attached to said base gate;

a removable forward base gate hinge means attached to said left side panel and rotatably attached to said base gate;

a transverse base gate hinge means attached to said right side panel and rotatably attached to said base gate, said transverse base gate hinge means adapted to receive a portion of said removable forward base gate hinge means;

a removable support means attached to said left side panel and to both said base gate and to said secondary gate.

2. The combination as claimed in claim 1 in which said removable support means is comprised of:

a removable base gate support member, removably attached to said base gate and to said left side panel;

a removable secondary gate support means attached to said secondary gate and to said left side panel.

3. The combination as claimed in claim 2 in which said rear base gate hinge means is comprised of:

a hollow cylinder attached to said left side panel;

a pivot member within said hollow cylinder and rotatably positioned within said base gate.

4. The combination as claimed in claim 3 in which said forward base gate hinge means is comprised of:

a hollow cylinder attached to said left side panel;

a pivot member within said hollow cylinder of said forward base gate hinge means and rotatably positioned within said base gate.

5. The combination as claimed in claim 4 in which said transverse base gate hinge means is comprised of:

a hollow cylinder attached to said right side panel;

wherein at least said pivot member of said forward base gate hinge means is positionable within said hollow cylinder of said transverse base gate hinge means.

6. The combination as claimed in claim 5 having a lock member rotatably attached to said base gate and engageable by said secondary gate.

7. The combination as claimed in claim 6 in which at least said pivot member of said mean base gate hinge means has a padlock-receiving hole therethrough adapted to receive a padlock;

whereby said pivot member of said mean base gate hinge means is prevented from being withdrawn from a said hollow cylinder to which it is attached.

* * * * *